United States Patent [19]
Gerber et al.

[11] 3,984,747
[45] Oct. 5, 1976

[54] HIGH ACCURACY PLOTTER

[75] Inventors: Heinz Joseph Gerber, West Hartford; David J. Logan, Glastonbury, both of Conn.

[73] Assignee: The Gerber Scientific Instrument Company, South Windsor, Conn.

[22] Filed: Jan. 7, 1975

[21] Appl. No.: 539,053

[52] U.S. Cl. .............................................. 318/632
[51] Int. Cl.² ...................................... G05B 23/275
[58] Field of Search ...................................... 318/632

[56] References Cited
UNITED STATES PATENTS

| | | | |
|---|---|---|---|
| 3,757,188 | 9/1973 | Brewer et al. | 318/632 |
| 3,781,629 | 12/1973 | Yashimoto et al. | 318/632 |
| 3,893,011 | 7/1975 | Inaba et al. | 318/632 |
| 3,896,361 | 7/1975 | Inaba et al. | 318/632 X |
| 3,911,347 | 10/1975 | Hartung | 318/632 |

Primary Examiner—B. Dobeck
Attorney, Agent, or Firm—McCormick, Paulding & Huber

[57] ABSTRACT

A high accuracy drum plotter utilizes a lightweight structurally rigid plotting drum to obtain high accelerations and, correspondingly, high throughput of information. The information is generated graphically on a plotting material which is held on the light weight drum by means of a vacuum system. High accuracy is maintained by providing compensation apparatus for adjusting drum rotation in accordance with plotting material thickness.

5 Claims, 4 Drawing Figures

3,984,747

HIGH ACCURACY PLOTTER

BACKGROUND OF THE INVENTION

The present invention relates to apparatus for plotting graphic information on sheet material and, more particularly, it is concerned with a high accuracy drum plotter having a drum to which a sheet of plotting material is directly and securely attached for precise movement with the drum.

Prior art plotters for producing graphic information on sheet material have been of two general types. A flat bed plotter utilizes a system of two carriages which are suspended over the flat support surface of a stationary table and translate a plotting head mounted on the carriages over the table along corrdinate directions or axes. A drum plotter such as disclosed in U.S. patent application, Ser. No. 353,117, filed Apr. 20, 1973 and owned by the assignee of the present invention has a rotatable plotting drum which moves the plotting material in one coordinate direction about the driven axis and a carriage-mounted plotting head which moves in another coordinate direction parallel to the axis of the drum.

From the standpoint of high speed performance, the drum plotter offers the advantage that the relatively heavy drive motors associated with each of the coordinate directions may remain stationary. In flat bed plotters, the drive motors and associated carriages which translate the plotting head usually move with the head and, hence, the total weight and corresponding inertia of the movable components reduces the speed, acceleration and accuracy with which such plotters operate. The plotting paper, however, is held stationary during plotting and may be drawn securely against the support surface of the flat bed by means of a vacuum system. Of course, drum plotters such as disclosed in the above-identified application present accuracy problems in feeding the plotting material, generally a high quality paper, back and forth between storage rolls at opposite sides of the plotting drum. Eliminating movements of the paper relative to the support surface of the plotting drum in the course of a plotting operation removes the element of error accompanying such movement.

Throughput of information is also an important measure of plotter performance. Throughput is defined as the quantity information or data processed in a given unit of time. In plotters, the factors which limit throughput are the maximum velocities and accelerations of the plotting head and the paper relative to one another, assuming that the electrical components of the data handling equipment can keep up with the mechanical components. While both acceleration and velocity are important, changes in the maximum acceleration of a plotter have a greater effect upon throughput if a nominal maximum velocity is obtainable. Acceleration becomes more significant because most plotting operations are comprised of a series of interconnected line segments of relatively short length. Maximum velocity is seldom achieved along such segments. Therefore, if the maximum velocity of a plotter is increased 50% from 2000 ipm (50 mpm) to 4000 ipm (100 mpm), the net increase in throughput may be not more than 10% depending upon the particular graphic being plotted. An increase of 50% in acceleration, however, could increase throughput three or four times that of a corresponding increase in velocity. Thus, the lower moving inertia inherent in drum plotters and the corresponding higher acceleration provide a better basis for higher throughput and performance.

It is also noted that by utilizing a plotting drum on which the plotting material is fixedly secured during a plotting operation, the feed mechanism and drive sprockets which have been used in the past to move the material over the drum may be eliminated. While elimination of such feed mechanism limits the maximum length of plots that may be produced by the drum plotter, many plots requiring high accuracy can be accommodated on standard drawing sheets that are equal to or smaller than the surface of a drum having, for example, a 16 inch (40 cm) diameter. Securing the plotting material fixedly on the drum also utilizes the inherent column strength of plotting material such as paper to prevent wrinkling and thus ensures that the paper will remain spread in a flat condition on the drum support surface.

It is, accordingly, a general object of the present invention to disclose a high performance drum plotter which is constructed to permit high accuracy plotting to be carried out with high throughput.

SUMMARY OF THE INVENTION

The present invention resides in a drum plotter having a rotatable plotting drum to which sheets of plotting material are fixedly secured for plotting operations.

In one aspect of the invention, the plotting drum is a hollow, light-weight drum rotatable relative to a plotting head about a fixed drum axis. The plotting head is movable parallel to the drum axis for recording information in one coordinate direction, Y, while the drum is rotated to translate the plotting material relative to the head in another coordinate direction, X. The drum is comprised of a pair of end plates and a first cylinder interconnecting the end plates. The cylinder defines an outside support surface on which plotting material is spread and is provided with a plurality of fine perforations distributed over the support surface to communicate the support surface with the interior surface of the cylinder.

A hollow support shaft extends coaxially of the plotting drum axis and means are provided to connect the hollow interior of the shaft with the interior surface of the drum. Vacuum pumping means are connected to one end of the support shaft exposed externally of the drum to permit a vacuum or low pressure to be generated at the support surface of the drum through the perforations in the cylinder. Drive means are connected to the drum for rotating the drum about the drum axis.

In a preferred form of the invention, a second non-perforated cylinder is located within the first cylinder to form a double-walled drum and to define an annular plenum chamber between the cylinders. Reinforcing ribs are installed between the drums so that atmospheric pressure operating upon both of the cylinders may be supported more easily by the drum when the plenum is evacuated.

In accordance with another aspect of the invention, digital control means is associated with the drive motor for the drum or the plotting head or both, and an adjustable compensating means is interposed between the digital means and the drive motor for fractionally reducing the digital motor pulses which rotate the drive motor. Such compensating means permits, for example, the rotation of the drum to be adjusted or fractionally reduced in accordance with the thickness of the plotting paper positioned on the drum. Thus, the circumferential dimension of a plot on the drum can be reduced by a small fraction to compensate for the finite increase that the plot would reveal in that dimension due to the slightly larger radius of the plot attributable to the thickness of the plotting material on the support surface of the drum.

DESCRIPTION OF THE PREFERRED EMBODIMENTS

Figure 1:
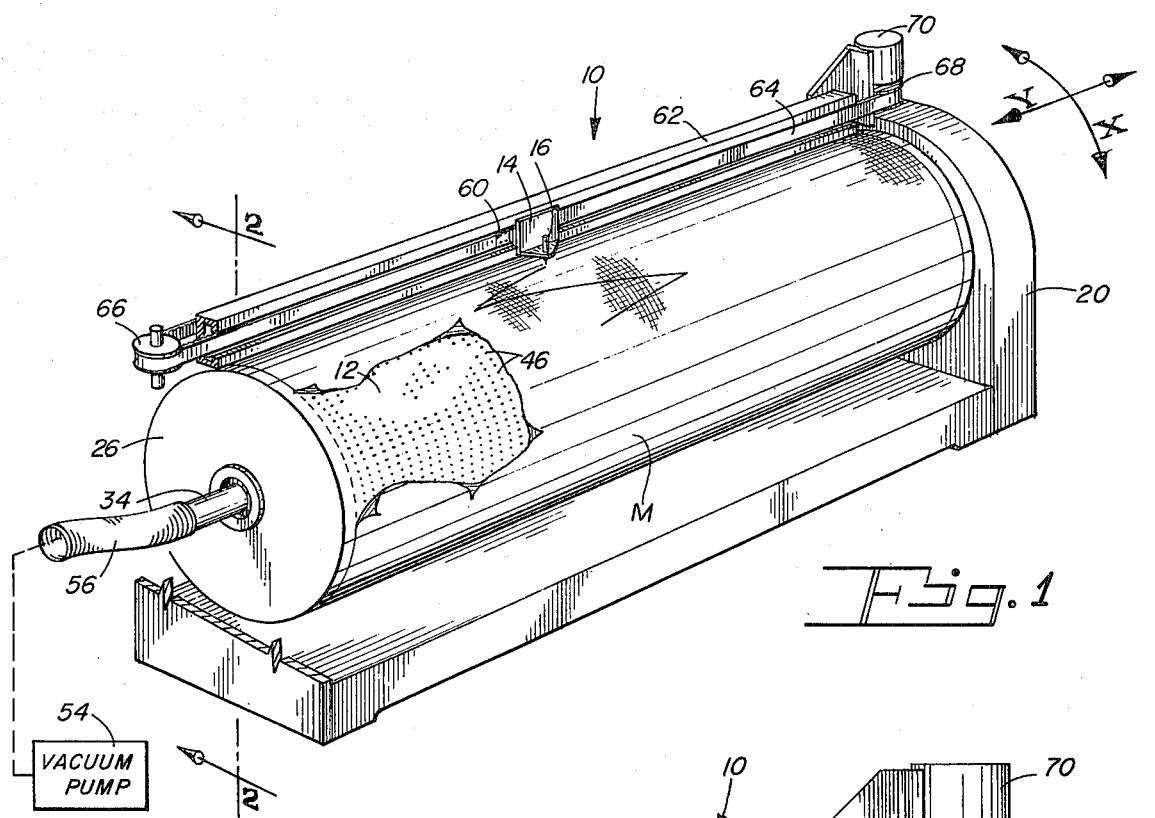
FIG. 1 is a perspective view of a drum plotter incorporating the features of the present invention.
Figure 2:
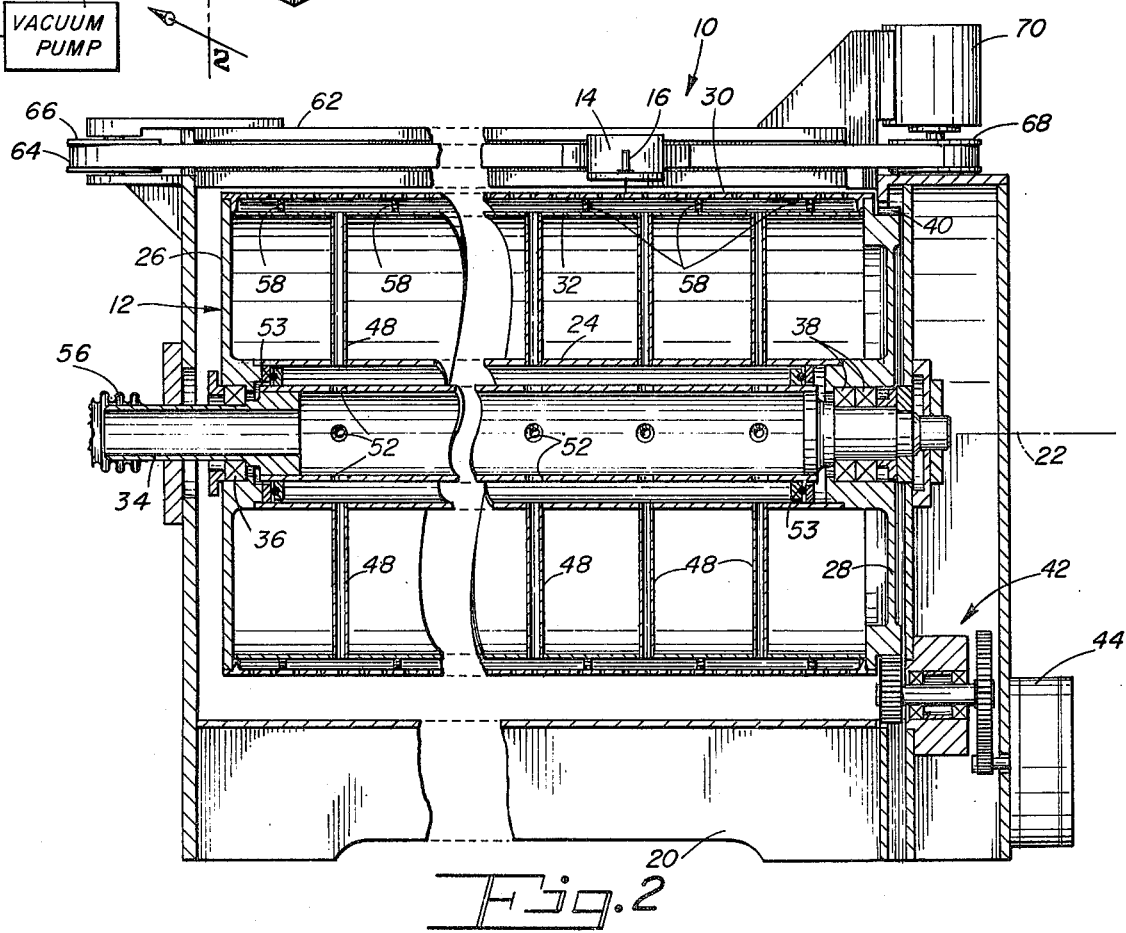
FIG. 2 is a cross-sectional view of the plotter in FIG. 1 showing the internal construction of the plotting drum.

FIGS. 1 and 2 illustrate a drum plotter, generally designated 10, which is constructed in accordance with the present invention to provide high accelerations and high accuracy plots on single sheets of plotting material M. The plotter 10 includes a rotatable plotting drum 12 and a plotting head 14 on which a wet ink or other suitable pen 16 is supported for movement over the plotting material on the drum. Components for moving the pen 16 in and out of contact with the material are not shown, but may comprise a solenoid which pushes the pen downward into contact with the plotting material and a counteracting spring which lifts the plotting pen away from the material when the solenoid is deactivated. Both the plotting drum 12 and the plotting head 14 are mounted on a frame 20 which is partially broken away in FIG. 1 for clarity.

As shown most clearly in FIG. 2, the drum 12 is mounted between the ends of the frame 20 for rotation about the drum axis 22. The drum is comprised of two end plates 26 and 28 and two cylinders 30 and 32 and a central sleeve 24 interconnecting the end plates so that a hollow drum interior is formed with an annular plenum chamber lying between the inner suface of the outer cylinder 30 and the outer surface of the inner cylinder 32. The end plates 26 and 28 are rotatably mounted on a hollow shaft 34 which extends between the opposite ends of the frame 20. The shaft 34 is fixedly secured to the frame so that it is not rotatable about the axis 22 and, therefore, bearings 36 and 38 are provided between the opposite ends of the shaft and the end plates 26 and 28. The end plate 28 has a drive gear 40 either connected to or integrally formed in the plate and the dirve gear is connected through a gear reduction unit 42 to the X-axis or drum drive motor 44. Thus energization of the drive motor 44 produces a corresponding rotation of the drum 12 about the drum axis 22.

The outer cylinder 30 has a curved exterior support surface on which the plotting material M rests. The curved support surface of the drum automatically induces the material to lie flat on the surface without wrinkles. The surface also permits the inherent column strength of the material to prevent wrinkles from forming during the plotting operation. A plurality of perforations 46 extend from the support surface through the cylinder wall to the inner suface. The inner cylinder 32 is non-perforated and thus the plenum chamber defined between the cylinders communicates with the support surface of the cylinder 32 through the perforations.

Several fluid conduits 48 serving as manifolding extend between the cylinder 32 and the sleeve 24 at different axial stations within the drum. The conduits have a fixed attachment with the inner cylinder 32 and communicate through the wall of the cylinder 32 with the plenum chamber between the cylinders 30 and 32. The hollow shaft 34 has a plurality of openings 52 in the shaft wall which connect the interior of the hollow shaft with the conduits 48 and the plenum chamber. Sliding seals 53 between the stationary outer surface of the shaft 34 and the sleeve 32 aid in preventing the fluid communication between the hollow shaft 34 and the conduits 48 from leaking so that a rotating, air-tight joint is provided between the shaft and the conduit 48. A vacuum pump 54 and a hose 56 connected between the pump and the shaft 34 as shown in FIG. 1 permit the plenum chamber to be evacuated and allow plotting material to be pulled toward and securely held on the perforated support surface of the drum 12.

It will be observed that the vacuum pump 54, the associated conduits and the perforations 46 hold the plotting material against the support surface of the drum 12 without any auxiliary fasteners or clips. Thus the total moment of inertia of the drum is not increased by any fastening structure at large radial distances from the drum axis 22. The perforations 46 shown in FIG. 1 are distributed evenly over the support surface, however, it is contemplated that higher density perforations may be situated at locations on the plotting drum which would coincide with the perimeters of standard size sheets of plotting material.

A plurality of perforated, reinforcing ribs or rings 58 are interposed between the cylinders 30 and 32 to transmit loads between the inner and outer cylinders when a vacuum is drawn in the plenum chamber. Atmospheric pressure operating inwardly on the outer cylinder 30 and outwardly on the inner cylinder 32 creates substantially equal and opposite forces and the reinforcing ribs 58 prevent such forces from crushing the cylinders. It is apparent that the ribs 58 could be eliminated if the cylinders 30 and 32, or the cylinder 30 by itself in the absence of the inner cylinder 32, had wall thicknesses that were large enough to support atmospheric pressure. However, increasing the thickness of the walls also increases the moment of inertia of the rotatable plotting drum 32 and decreases the maximum acceleration which can be derived from a given drive motor 44. Thus, the light weight, double wall construction provided by the cylinders 30 and 32 and the reinforcing ribs 58 is preferred. Tangential accelerations in the range of 3g have been experienced which is an improvement of 50% over current state-of-the-art drum plotters.

It will also be noted that by mounting the drum 12 on a stationary shaft 34 by means of the bearing 36 and 38, the inertia of the shaft does not contribute to the drum inertia moved by the drive motor 44.

The plotting head 14 is mounted on a slide 60 engaged in the groove of a guide rail 62 extending between opposite ends of the frame 20. The slot in the rail and hence the movement of the head 14 is parallel to the axis 22 of the drum so that motion of the head relative to the rail translates the plotting pen 16 over the plotting material and the drum. By lowering the pen 16 into engagement with plotting material while the drum 12 and head 14 are moving, a line trace such as that illustrated in FIG. 1 is produced. The pen 16 may be a wet ink pen, a ballpoint pen or other plotting instrument including a scribe for producing graphic information in various mediums on the plotting drum.

The slide 60 is connected to an endless toothed belt 64 which is stretched between pulleys 66 and 68 at opposite ends of the frame 20. The pulleys 66 is an idler pulley and the pulley 68 is a drive pulley rotatably driven by means of a Y-axis drive motor 70. The idler pulley 66 may be mounted in a slide block for tensioning the belt 64 to an extent which eliminates any backlash in the belt and slide movements. It will be understood that rotation of the drive motor 70 produces a corresponding displacement of the pen 16 in the Y-coordinate direction parallel to the drum axis 22 while rotations of the drive motor 44 rotate the drum 12 and displace the plotting material M relative to the pen in the X-coordinate direction. Composite motions along the X-and Y-coordinate directions move the pen and the plotting material relative to one another in any direction between the X- and Y-coordinate axes so that line traces and corresponding graphic information can be produced at any desired location on the plotting material.

It will be understood that when a sheet of plotting material is placed on the support surface of the drum 12, the effective radius of the surface on which the pen 16 operates is slightly greater than that of the support surface itself. Thus, the circumferential length of a plot or trace produced on the exposed surface of the plotting material by a given plotting program varies with plotting materials of different thicknesses. While such variations might normally be considered insignificant, they do become significant when accuracies in the order of 0.004 inch (0.1 mm) are to be maintained throughout a plot. Such accuracies are of the same order of magnitude as the paper thickness and, consequently, the use of plotting materials having different thicknesses can create meaningful errors.

In accordance with another feature of the invention, therefore, means are provided to compensate for the variations in plotting material thickness that produce meaningful plotting errors when different plotting materials are placed on the drum 12.

Figure 3:
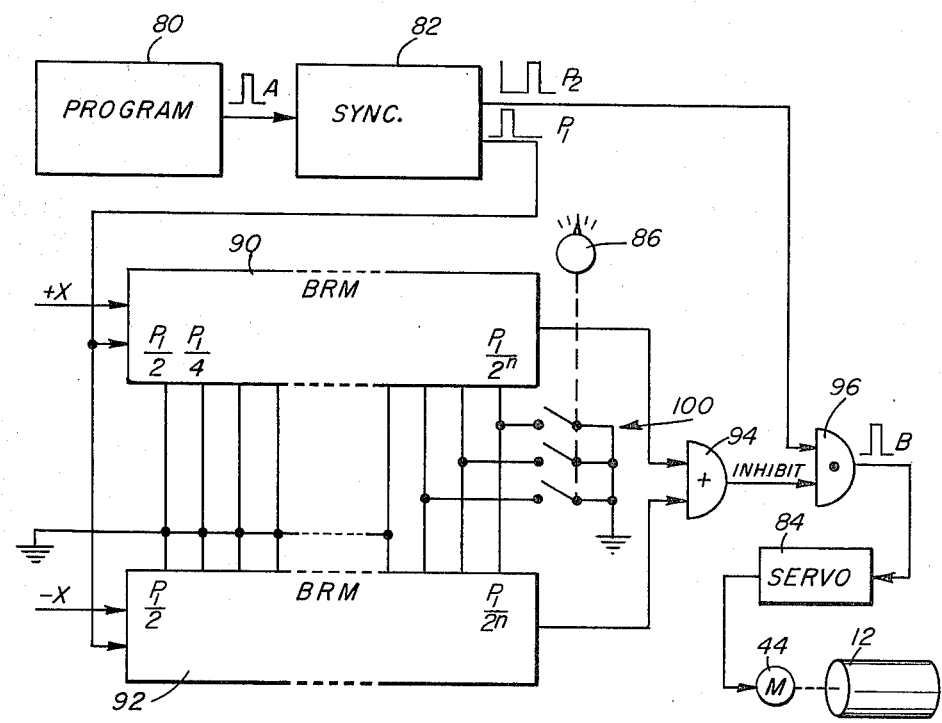
FIG. 3 is a schematic diagram of the paper thickness compensation apparatus in the control system for the drum plotter.

FIG. 3 illustrates the digital control channel for the X-axis which is associated with the relative movements between the plotting head 14 and the pen 16 as the drum 12 is rotated. A plotting program device, generally designated 80, such as a hard-wired or general purpose computer outputs a series of motor pulses A, each pulse of which represents a command for incrementally rotating the plotting drum 12 by a very small and fixed amount. A series of such pulses applied in rapid succession produces accurate, large-scale displacements or rotations of the X-axis drive motor 44 and drum 12 and corresponding displacements of the plotting material M relative to the pen. Another set of motor pulses would also be provided through another control channel to the Y-axis drive motor 70 to displace the plotting head 14 relative to the material parallel to the drum axis 22.

Normally, the motor pulses A derived from the program device 80 are asynchronous, that is not referenced to a standard time frame. Therefore, the motor pulses A are applied to a synchronizer 82 which produces time-phased motor pulses $P_1$ and $P_2$ referenced to a standard clock or time frame. The remaining controls for the plotting drum are also referenced to the same clock. In the synchronizer, each pulse A produces one pulse $P_1$ of given pulse width and a second, non-overlapping pulse $P_2$ of the same pulse width. The synchronizer may be comprised of two serially connected flip-flops and two gate circuits connected in parallel to the output of the second flip-flop. The gate circuits are triggered respectively by different phases of a multi-phase crystal oscillator or clock to produce the pulses $P_1$ and $P_2$ each time a motor pulse A is applied to the synchronizer. The frequency of the crystal oscillator is, of course, significantly higher than the most rapid output rate of the programmed device 80 to insure that adjacent motor pulses A will not produce any overlap in the pulses $P_1$ and $P_2$.

The number of motor pulses $P_2$ applied to the drive motor 44 through a digital-to-analog servo-driver 84 are fractionally reduced in accordance with a manually set compensation knob 86 that may be exposed on the exterior of the plotter 10. By reducing the number of pulses which reach the servo 84, the rotations of the drum commanded by the program device 80 are fractionally reduced. Establishing the fractional reduction to correspond with the thickness of the plotting material applied to the drum results in no distortion of the graphic information plotted in the X-coordinate direction, that is, the coordinate axis associated with rotations of the drum.

For this purpose, the motor pulses $P_1$ are applied to binary rate multipliers (BRM) 90 and 92, each of which when operating reduces the pulse number or pulse rates in conventional fashion. The multipliers 90 and 92 may be comprised of decade-connected multipliers, type 7497 manufactured by Texas Instruments, Inc. The structure of such multipliers and their operation are explained in greater detail in the TTL Data Book available from Texas Instruments. Briefly, however, such multipliers have a strobe input to which the pulses $P_1$ are applied, a series of rate inputs or control terminals, $P_1/2 \ldots P_1/2^n$ and an output terminal which is connected in the present application with an OR gate 94. Each of the multipliers 90 and 92 includes an enable terminal to which a sign or sense signal, that is either +X or −X is applied depending upon the direction of rotation of the drum 12 commanded by the programming device 80. Thus, only one of the multipliers will be operating at any time during a plotting operation.

The fractional reduction of the number or rate of pulses $P_2$ which become pulses B reaching the servo 84 is determined by the specific rate inputs of the multiplier 90 or 92 grounded. By grounding specified ones of the rate inputs, the output of the multiplier will be turned off at selected times and thusly produce an inhibit signal to prevent the gating of a pulse $P_2$ through an AND gate 96 to the servo 84 as pulses B. For example, if the rate input $P_1/2$ is the only rate input grounded, the output of the multiplier 90 or 92 is shut off by alternate pulses $P_1$ and is turned on by the intervening pulses $P_1$. Thus, half of the pulses $P_2$ are transmitted by the AND gate 96 to the servo. If both of the rate inputs $P_1/2$ and $P_1/4$ are grounded, the output of the multiplier 90 or 92 remains on for three-fourths of the pulses $P_1$ and, correspondingly, eliminates only one-fourth of the pulses $P_2$ transmitted to the servo 84. As more of the lower order rate inputs are grounded, less of the pulses $P_2$ are eliminated and, therefore, a finer compensation is produced. It should also be noted that the pulses eliminated by the multiplier from the pulses $P_2$ are individual pulses evenly distributed in the pulse series. Therefore, with many pulses being required to produce small rotations of the drum 12, even short displacements of the plotting pen 16 on the plotting material M will be proportionally reduced.

It will be recognized that compensations for plotting material thickness will be relatively minute and the number of pulses which must be dropped to slightly reduce the drum rotations will be relatively small compared to the total number of motor pulses programmed. For this reason, an adjustable switching circuit 100 controlled by the compensation knob 86 is only connected to the lower order inputs $P_1/2^n$, $P_1/2^{n-1}$, etc. The higher order inputs $P_1/2$ $P_1/4$ etc. are permanently grounded since such large scale compensation is not needed.

It should also be noted that the switching circuit 100 may be comprised of a wafer switch which is turned to different switch conditions by the compensation knob 86 to selectively ground one or more of the low-order rate inputs in a given sequence and combinations calibrated for plotting materials of various thicknesses. Thus, for example, the knob 86 may have five different detent positions corresponding to five different switch conditions. At one extreme position of the knob 86, only the lowest or the two lowest order rate inputs may be grounded for the thinnest material and smallest compensation. At the other positions other rate inputs would be grounded in accordance with the binary logic of the multipliers to provide greater compensation. Therefore, although the switching circuit is illustrated schematically as including only three single pole switches, closing of those switches by the knob 86 in various sequences and combinations is contemplated. The grounding of the lowest order inputs corresponds to a minimum of compensation for thin plotting materials and the grounding of higher order inputs with or without the lower order inputs results in greater compensation for thicker materials. The adjustments or settings of the switching circuit and the resulting fractional reductions in motor pulses are therefore scaled in magnitude for plotting errors that would be produced by different paper thicknesses.

Figure 4:
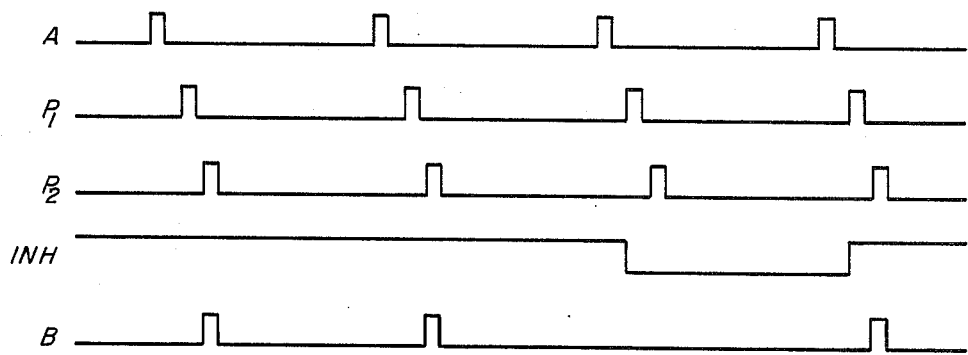
FIG. 4 illustrates a series of motor pulses from different parts of the control system illustrated in FIG. 3 and shows the time relationship of the pulses.

FIG. 4 illustrates the various motor pulses in a given frame and includes the inhibit output generated by the AND gate 94 to eliminate selected ones of the motor pulses $P_2$ transmitted to the servo 84. It will be observed that a motor pulse $P_1$ and a motor pulse $P_2$ are generated for each of the motor pulses A. Also, when the output of the multipliers is turned off, an inhibit signal occurs between the leading edges of selected motor pulses $P_1$. Furthermore, the motor pulses B reaching the servo 84 coincide with the motor pulses $P_2$ except during the interval when the output of the multipliers is off and the corresponding inhibit signal sets the AND gate 96 in the "off" state.

Thus, a high accuracy drum plotter is provided with a plotting drum having a construction which minimizes the inertial load imposed on the drive motor to obtain high acceleration and, correspondingly, high throughput. To maintain high accuracy even though plotting materials of various thickness are positioned on the plotting drum, compensating means have been provided in the digital controls to fractionally reduce the drum plotter rotations.

While the present invention has been disclosed in a preferred embodiment, it should be understood that numerous modifications and substitutions can be had without departing from the spirit of the invention. For example, the manifolding connecting the vacuum pump 54 to the annular plenum chamber below the support surface of the drum 12 may be varied to accommodate different structure on which the drum is rotated. The specific form of the ribs 60 interposed in the vacuum chamber to transmit pressure forces between the inner cylinder 32 and the outer cylinder 30 is not specified in detail since many types of reinforcement will carry the inter-cylinder loads and permit the vacuum to be drawn at various portions of the support surface. It is also possible that selected valving in the manifolding between the vacuum pump and the support surface can be provided in order to localize the zone of the support surface energized by the vacuum at that area where holddown forces are needed. Thus, sheets of plotting material smaller than the entire support surface may be positioned on the drum and the capacity of the vacuum pump 54 may be reduced from that which would otherwise be necessary. The compensation apparatus which permits high accuracy plots to be maintained even though plotting materials of different thickness are employed can also be utilized in the digital controls for the Y-coordinate axis in order to compensate for slight variations in the effective radius of the toothed drive belt 64 on the pulleys 66 and 68 when tension is applied to the belt during assembly of the plotter. Of course, in the Y-control axis, such compensation would not normally be adjusted after it was set unless a new drive belt was installed or a new tension adjustment was made in the belt. Accordingly, the present invention has been described in a preferred embodiment by way of illustration rather than limitation.

We claim:
1. In a high accuracy digital drum plotter having a plotting drum rotatable about a drum axis relative to a plotting head and defining a support surface on which a sheet of plotting material is held during a plotting operation, separate rotatable drive motors associated with separate control axes being connected respectively with the drum and the head, the improvement comprising:

digital control means associated with the drive motor connected with the drum for producing motor pulses to incrementally displace the drive motor and rotate the drum a given amount for each pulse; and adjustable compensating means interposed between the digital control means and the drive motor connected with the drum for fractionally reducing the number of motor pulses received by the drive motor from the control means and, correspondingly, reducing the rotation of the drum, the compensating means having a selectively adjustable switching means establishing predetermined fractional reductions in the number of motor pulses received by the drive motor from the control means, the adjustments of the switching means and the fractional reductions being scaled in magnitude for plotting errors attributable to variations in thickness of plotting materials held on the support surface of the plotting drum.

2. The improvement of claim 1 wherein the adjustable compensating means comprises a binary rate multiplier having a strobe or counter input to which the motor pulses are applied, and the adjustable switching means comprises a circuit connected to the rate inputs of the multiplier for making adjustments in the multiplier rate.

3. The improvement of claim 1 wherein the adjustable compensating means further includes:

means for producing first and second time-phased pulses for each motor pulse from the control means;

a binary rate multiplier receiving the first of the time-phased pulses and having rate inputs set in accordance with the switching means; and gating means connected with the binary rate multiplier and receiving the second of the time-phased pulses for inhibiting selected ones of the second pulses in accordance with the adjustment of the switching means.

4. The improvement of claim 1 wherein the adjustable compensating means comprises two binary rate multipliers having adjustable rate inputs, each multiplier having a strobe input connected with the digital control means and receiving the motor pulses for fractionally reducing the number of motor pulses and having an enable input connected with the digital control means and receiving a directional sense signal; and the adjustable switching means connects with the adjustable rate inputs for setting the multiplier rates.

5. The improvement of claim 4 wherein the adjustable switching means is calibrated for plotting materials of different thickness.

* * * * *